United States Patent [19]

Ito

[11] 4,386,412
[45] May 31, 1983

[54] CALCULATOR WITH EQUATION DISPLAY DEVICE

[75] Inventor: Hisashi Ito, Tanashi, Japan

[73] Assignee: Casio Computer Company, Ltd., Tokyo, Japan

[21] Appl. No.: 214,719

[22] Filed: Dec. 9, 1980

[30] Foreign Application Priority Data

Dec. 17, 1979 [JP] Japan .............................. 54-162715
Apr. 30, 1980 [JP] Japan .............................. 55-56195
Apr. 30, 1980 [JP] Japan .............................. 55-56197

[51] Int. Cl.³ ........................................... G06F 7/38
[52] U.S. Cl. .................................... 364/710; 364/709
[58] Field of Search ..................... 364/710, 709, 706

[56] References Cited

U.S. PATENT DOCUMENTS 3,839,630 10/1974 Olander, Jr. et al. .............. 364/709
3,971,924 7/1976 Ozawa et al. ...................... 364/709
3,971,925 7/1976 Wenninger et al. ................ 364/709
3,990,053 11/1976 Evans ................................. 364/709
4,016,411 4/1977 Genin ............................. 364/710 X Primary Examiner—David H. Malzahn
Attorney, Agent, or Firm—Frishauf, Holtz, Goodman & Woodward

[57] ABSTRACT

A calculator in which when numerical information and function information are sequentially input using ten keys and function keys of a key input section for obtaining a calculation result according to a calculation formula, the input information is stored in a memory. The operation is then performed and, simultaneously, a character formula universally representing the calculation formula with the input numerals replaced with characters is prepared. This character formula is displayed by the display section so that the input condition may be easily confirmed and input errors may be prevented with certainty.

21 Claims, 28 Drawing Figures

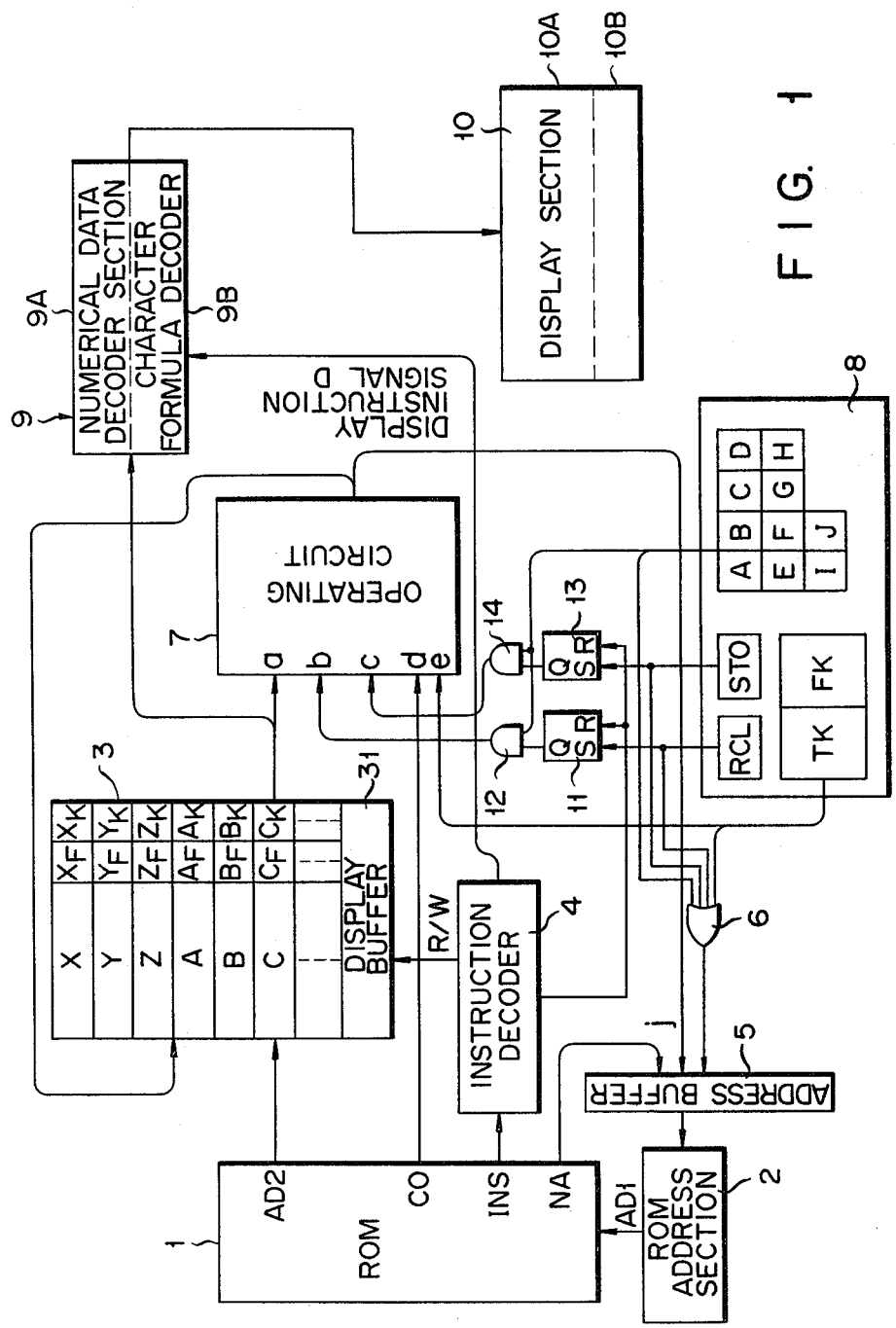
F I G. 1

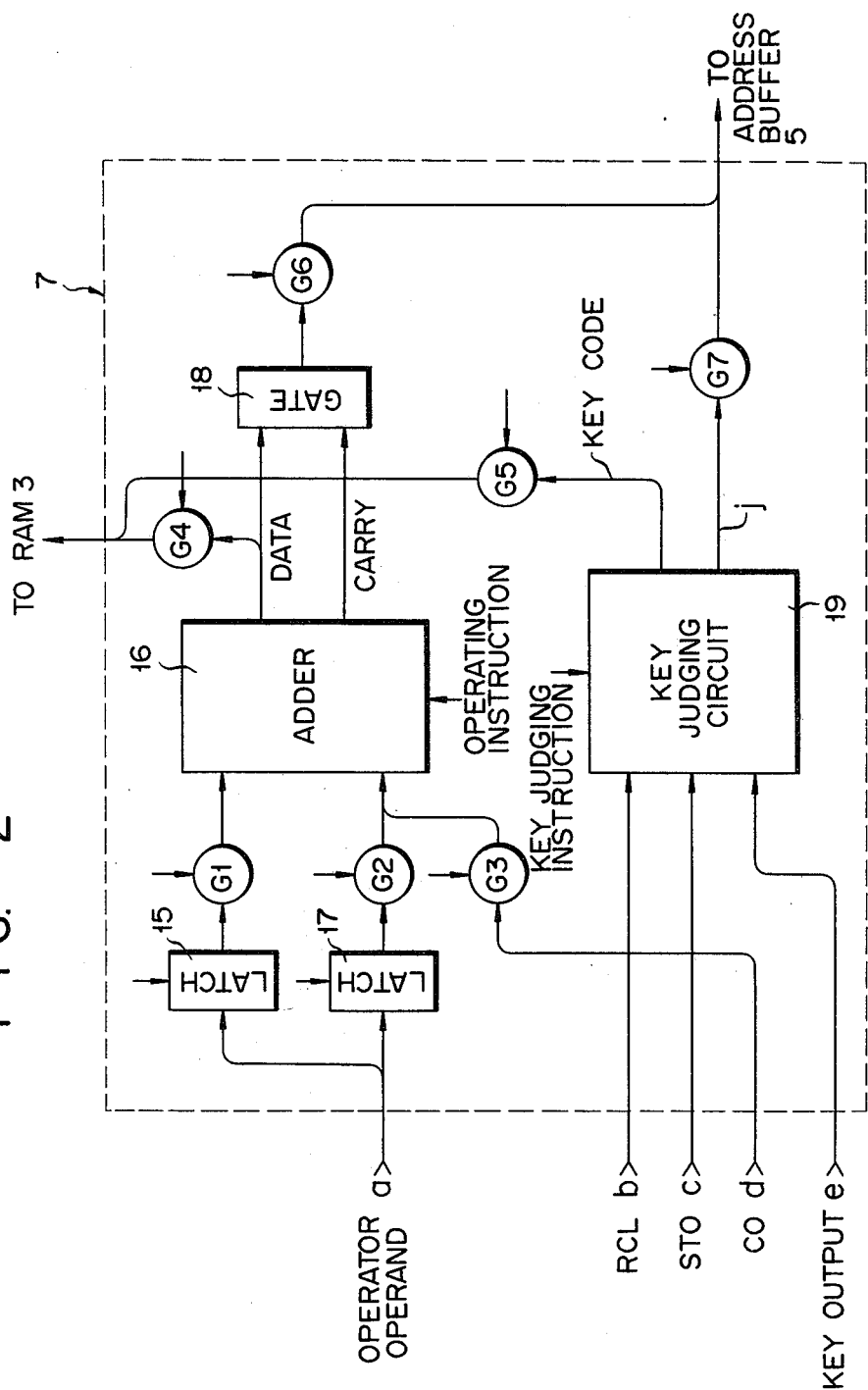

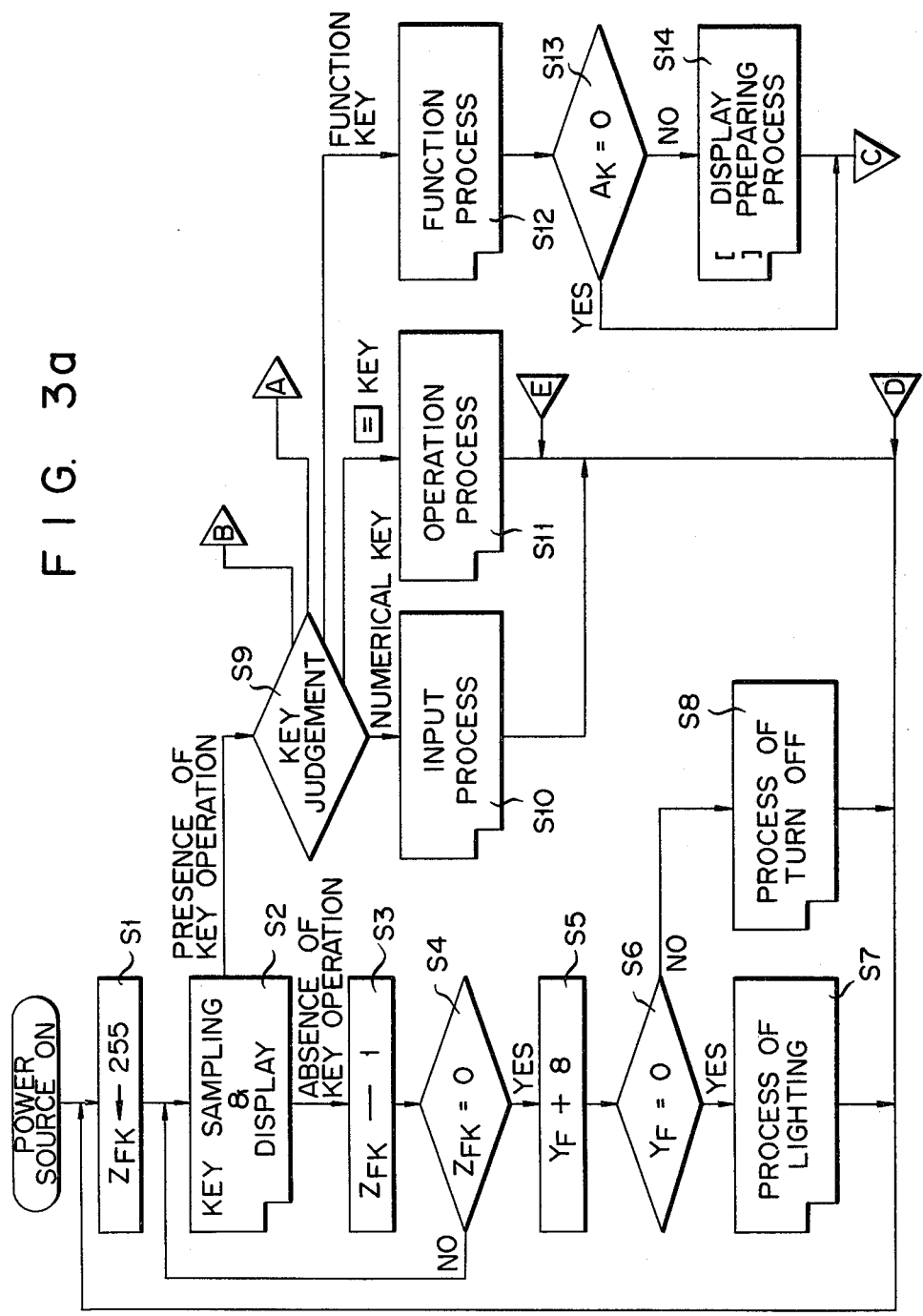

FIG. 4b

|   | F | K |
|---|---|---|
| A | 2 | + |
| B | 3 | X |
| C |   |   |
| D |   |   |
| E |   |   |
| F |   |   |
| G |   |   |
| H |   |   |
| I |   |   |
| J |   |   |

FIG. 4c

|   | F | K |
|---|---|---|
| A | 2 | + |
| B | 3 | X |
| C |   | 1 |
| D |   |   |
| E |   |   |
| F |   |   |
| G |   |   |
| H |   |   |
| I |   |   |
| J |   |   |

FIG. 4d

|   | F | K |
|---|---|---|
| A | 2 | + |   |
| B | 3 | X |   |
| C | 4 | + | 1 |
| D |   |   | 2 |
| E |   |   |   |
| F |   |   |   |
| G |   |   |   |
| H |   |   |   |
| I |   |   |   |
| J |   |   |   |

FIG. 4e

|   | F | K |
|---|---|---|
| A | 2 | + |   |
| B | 3 | X |   |
| C | 4 | + | 1 |
| D | 123 | + | 2 |
| E |   |   |   |
| F |   |   |   |
| G |   |   |   |
| H |   |   |   |
| I |   |   |   |
| J |   |   |   |

FIG. 4f

|   | | F | K |
|---|---|---|---|
| A |   | 2 | + |   |
| B |   | 5 | X |   |
| C |   | 4 | + | 1 |
| D |   | 1 2 3 | + | 2 |
| E |   |   |   |   |
| F |   |   |   |   |
| G |   |   |   |   |
| H |   |   |   |   |
| I |   |   |   |   |
| J |   |   |   |   |

FIG. 4g

|   | | F | K |
|---|---|---|---|
| A |   | 2 | + |   |
| B |   | 5 | X |   |
| C |   | 4 | + | 1 |
| D |   | 1 2 9 |   | 1 |
| E |   |   |   |   |
| F |   |   |   |   |
| G |   |   |   |   |
| H |   |   |   |   |
| I |   |   |   |   |
| J |   |   |   |   |

|  | KEY OPERATION | DISPLAY STATE |
|---|---|---|
| FIG. 5a | POWER ON (AC) | 0. |
| FIG. 5b | 2 + | 2.<br>A+ |
| FIG. 5c | 3 X | 3.<br>A+BX |
| FIG. 5d | ( | 0.<br>A+BX [ |
| FIG. 5e | 4 + (( | 0.<br>A+BX [ C+ [ [ |
| FIG. 5f | 123 + | 123.<br>A+BX [ C+ [ [ D+ |
| FIG. 5g | RCL B | 3.<br>A+BX [ C+ [ [ D+ |
| FIG. 5h | 5 | 5.<br>A+BX [ C+ [ [ D+ |
| FIG. 5i | STO B | 5.<br>A+BX [ C+ [ [ D+ |

|   | 3 |  F | K |
|---|---|---|---|
| X | 775779 |  |  |
| Y |  |  |  |
| Z |  |  |  |
| A | 123 | + |  |
| B | 456 | X |  |
| C | 789 | + | [ |
| D | 912 | ] |  |
| E |  |  |  |

|   | 3 |   | F | K |
|---|---|---|---|---|
| X |   | 5 |   |   |
| Y |   |   |   |   |
| Z |   |   |   |   |
| A |   | 123 | + |   |
| B |   | 5 | X |   |
| C |   | 789 | + | I |
| D |   | 912 | ] |   |
| E |   |   |   |   |

|   | 3 |   | F | K |
|---|---|---|---|---|
| X |   | 789 |   |   |
| Y |   |   |   |   |
| Z |   |   |   |   |
| A |   | 123 | + |   |
| B |   | 5 | X |   |
| C |   | 789 | + | 1 |
| D |   | 912 | ] |   |
| E |   |   |   |   |

| | | F | K |
|---|---|---|---|
| X | 10000 | | |
| Y | | | |
| Z | | | |
| A | 123 | + | |
| B | 5 | X | |
| C | 10000 | + | 1 |
| D | 912 | | |
| E | | | |
| 31 | A+BX[C+D]= | | |

FIG. 7e

| | | F | K |
|---|---|---|---|
| X | 54683 | | |
| Y | | | |
| Z | | | |
| A | 125 | + | |
| B | 5 | X | |
| C | 10000 | + | 1 |
| D | 912 | ] | |
| E | | | |
| 31 | A+BX[C+D]= | | |

CALCULATOR WITH EQUATION DISPLAY DEVICE

BACKGROUND OF THE INVENTION

The present invention relates to a calculator which displays an input equation by means of characters.

A calculator can be used to perform calculations by inputting numerical information and function information according to a calculating formula for obtaining calculation results with ten numerical keys and function keys of +, −, ×, ÷, and so on of the keyboard. Since the display condition does not change when the function keys are operated, it is difficult to see which function key has been operated, or whether in fact it has been operated at all. A calculator has been thus proposed in which characters such as "+", "−", "×", "÷" and so on are displayed when the corresponding function keys are operated for confirming the input condition.

However, with such a calculator, it is only possible to confirm which key has been most recently operated, and it is not possible to confirm whether calculations are being performed according to the desired formula as a whole.

For performing operations of a long formula, especially with a calculator of the operation type according to the perfect algebraic method, the series of key operations is long. This leads to frequent key operation errors, and the operator becomes unsure whether or not the key input has been correctly performed according to the formula.

Even when the operator becomes aware of a key operation error, it is only possible to correct the key operation which has just been operated. Since it is impossible to correct other data whose input has been completed, the key operations must be performed once again from the beginning.

It is, therefore, the primary object of the present invention to provide a calculator in which the input condition of the information according to the calcuation formula for obtaining the calculation result is displayed by a character formula universally representing the kinds and sequences of the operations according to the calculation formula, so that confirmation of the input condition may be performed with ease and key operation errors may be prevented.

It is another object of the present invention to provide a calculator according to which it is possible to confirm the actual input data corresponding to any character of the character formula.

It is still another object of the present invention to provide a calculator according to which it is possible to change the data corresponding to any character of the character formula.

It is still another object of the present invention to provide a calculator according to which the display of the character formula may be held after the operations of the calculation formula for obtaining the calculation result have been completed, so that the operations may be repeated by substituting new data corresponding to any character in the character formula.

SUMMARY OF THE INVENTION

In order to accomplish the above and other objects, the present invention provides a calculator comprising:
a key input unit having at least ten keys and function keys of +, −, ×, ÷, and so on for inputting numerical data and function data according to a calculation formula;
a memory for storing numerical data and function data sequentially input from the key input unit;
operating means for performing operations according to the calculation formula based on the data stored in the memory;
character formula preparing means for preparing display data of a character formula, said display data consisting of characters corresponding to the calculation formula, based on the numerical data and function data stored in the memory;
a character formula display register for sequentially storing the character formula display data prepared by the character formula preparing means;
display control means for displaying input data or operation results and for displaying the character formula consisting of characters based on the contents of the character formula display register; and
a display section for displaying input data, operation results or the character formula.

According to the present invention, the input condition may be confirmed with certainty and the key operations may be performed with confidence even for key operations according to a long calculation formula.

When one is not too sure of the data whose input has already been completed during the key operation, confirmation of the data may be performed with ease.

When one realizes a key operation error during the key operation, the incorrect data alone may be corrected with ease, and the operations need not be repeated from the beginning.

Further, repeated operations may be performed using different sets of data with the same calculation formula by replacing the data corresponding to a character in the character formula of the display.

This invention can be more fully understood from the following detailed description when taken in conjunction with the accompanying drawings.

BRIEF DESCRIPTION OF THE DRAWING

FIG. 1 is a block diagram illustrating the system construction of the calculator according to the present invention;

FIG. 2 is a view illustrating the details of the operating circuit 7 of FIG. 1;

FIGS. 3(a) to 3(c) are flow charts for explaining the operation of the system shown in FIG. 1;

FIGS. 4(a) to 4(g) are views illustrating stored conditions of the registers of the RAM 3 of FIG. 1;

FIGS. 5(a) to 5(i) are views illustrating display conditions of the calculator according to the first embodiment of the present invention;

FIG. 6 is a view illustrating the display condition of a modification of the first embodiment;

FIGS. 7(a) to 7(e) are views illustrating stored conditions of the registers and the display buffer of the RAM 3 of the calculator according to the second embodiment of the present invention.

DETAILED DESCRIPTION

Figure 3B:
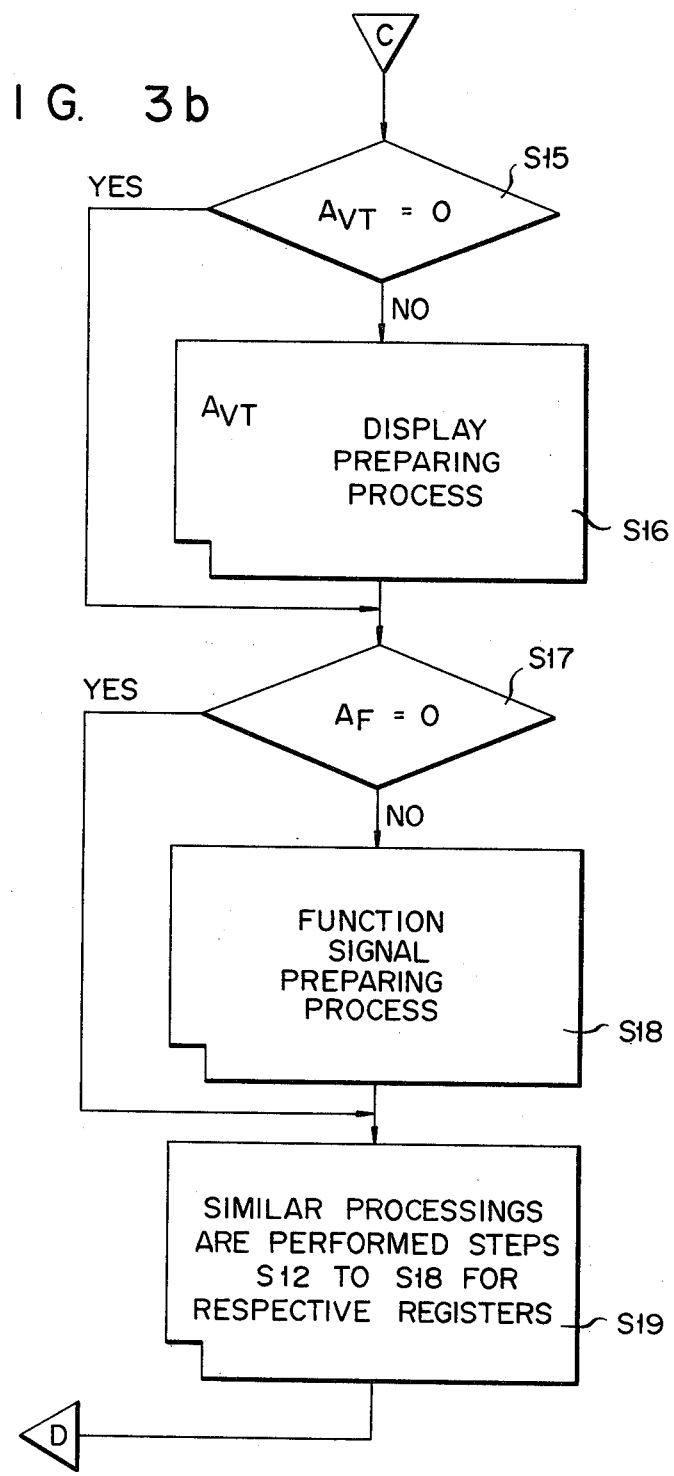
Figures 3C, 4A:
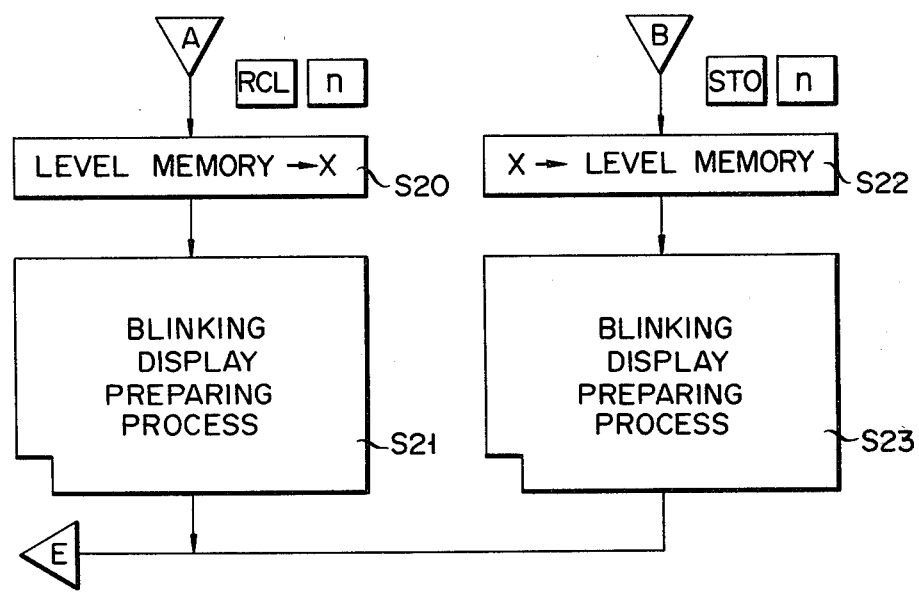

Referring to FIGS. 1-5, numeral 1 denotes a ROM (read-only memory) in which is stored a microprogram for controlling the overall operation of a compact electronic calculator having operation functions according to a complete formula. The ROM 1 also outputs microinstructions AD2, CO, INS, and NA parallel to each other from areas corresponding to address data AD1 outputted from a ROM address section 2. The microinstruction AD2 is the address data for specifying the columns and rows of the various registers inside a RAM (random access memory) 3 to be described later. Reading out and writing are performed for the digit specified by the register specified by this microinstruction. The microinstruction CO is the numerical data to be supplied to an input terminal d of an operating circuit 7. The microinstruction INS is the instruction data to be outputted to an instruction decoder 4. This microinstruction INS is decoded by the instruction decoder 4, and various instructions such as read/write signal R/W, a display instruction signal D and so on are generated. The read/write signal R/W is supplied to the RAM 3, and the display instruction signal D is supplied to a display controller 9. The microinstruction NA is the data for specifying the next address in which is stored the microinstruction to be outputted next from the ROM address section 2, and it is outputted to an address buffer 5. The output of an OR gate 6, to be described later, and a judged result signal j outputted from the operating circuit 7 are input to the address buffer 5. The address buffer 5 than OR adds the microinstruction NA, the output of the OR gate 6, and the judged result signal j, and supplies its output to the RAM address section 2.

The RAM 3 has registers X, Y, Z and A to J, a display buffer register 31, and a blink flag register for blink display having bits corresponding in number to respective digits of the display buffer register 31, to be described later, and so on (the registers E to J and the blink flag register are not shown in FIG. 1). The register X is a register for storing the input data and the display data. The registers Y and Z are the registers for operations. The ten registers A to J are protective registers for the data input by the operations up to the immediately preceding operation according to the complete formula. The first digit of each register is used for storing the parenthesis level, and this first digit is represented by the symbol K. The second digit of each register is used for storing the operation flag and is represented by the symbol F. The third digit and the rest of the digits of each register are for storing the numerical data and are represented by symbols VT. Referring to the parenthesis level, the parenthesis level is incremented by 1 when an opening parenthesis key [[] is operated, and decremented by 1 when a closing parenthesis key []] is operated. Codes corresponding to the function keys [+], [−], [×], [÷] and so on are written in the operation flags.

The operating circuit 7 is supplied with the data read out from the registers of the RAM 3 and the data input from a key input section 8, and it performs usual operations such as the four arithmetic operations and operations according to a complete formula. The operation result is input to a specified register inside the RAM 3. The operating circuit 7 also performs various judgement operations during the key sampling operation or during the various judging operations as shown in the flow chart of FIG. 3. It performs, for example, a judgment operation for judging the kind of key operated from the key operation signal input from a key input section 8. The judged result signal j outputted at such a time is supplied to the address buffer 5 as has already been described. The details of the operating circuit 7 will be described with reference to FIG. 2.

The key input section 8 includes ten keys TK, various function keys FK, character formula display keys [A] to [J], a recall key [RCL], a store key [STO] and so on. The recall key [RCL] is the key for specifying and recalling a particular character signal when the data corresponding to the particular character signal in the display is to be confirmed. The store key [STO] is the key for replacing with different data the data corresponding to the particular character signal in the character formula of the display. The output of the recall key [RCL] is supplied to the OR gate 6 and to the set input terminal of an SR type flip-flop 11 (to be referred to as FF 11 for brevity hereinafter). The set output of the FF 11 is input to an input terminal b of the operating circuit 7 through an AND gate 12. The output of the store key [STO] is supplied to the OR gate 6 and to the set input terminal S of an SR type flip-flop 13 (to be referred to as FF 13 for brevity hereinafter). The set output of the FF 13 is input to an input terminal C of the operating circuit 7 through an AND gate 14. The outputs of the character formula display keys A to J are input to the OR gate 6 and are utilized as control signals for opening and closing the respective gates of the AND gates 12 and 14. The respective outputs of the ten keys TK and the functions keys FK are input to the OR gate 6 and to an input terminal e of the operating circuit 7.

The display controller 9 comprises a numerical data decoder section 9A and a character formula decoder section 9B. The numerical data from the key input section 8 and the operation result data from the operating circuit 7 and so on are input to the numerical data decoder 9A through the register X. The character formula data input from the display buffer is input to the character formula decoder section 9B. When the display instruction signal D is input, the numerical data decoder section 9A and the character formula decoder section 9B decode the numerical data or the character formula data and supply the outputs to a display section 10 for display.

The display section 10 includes a numerical data display section 10A and a character formula display section 10B, and it employs a display system of dot matrix construction. The operation condition while performing the operations according to the complete formula is displayed by the character formula at the character formula display section 10B, and the operation condition is also displayed by the numerical data at the numerical display section 10A. The character formula is displayed in this embodiment by the letters A, B, C, D, ... and the symbols +, −, ×, ÷, [, ], ..., for example:

A+B×[C+[[D+

The letters A, B, C, D, ... correspond to the input data according to the input sequence, and the symbols +, −, ×, ÷, [, ], ... represent the respective function data of addition, subtraction, multiplication, division, opening parenthesis, closing parenthesis, and so on.

The construction of the operating circuit 7 will now be described with reference to FIG. 2. The respective data of the operator and the operand supplied from the RAM 3 are inputted to an input terminal a. The operand, after being input to a latch 15, is supplied to an adder 16 through a gate circuit G1. The operator, after being input to a latch 17, is supplied to the adder 16 through a gate circuit G2. The numerical data obtained by the microinstruction CO input at the input terminal d is also input as the operator to the adder 16 through a gate circuit G3 as needed. Thus, the adder 16 performs the four arithmetic operations on both kinds of input data, as well as general operations according to the complete formula or the like, and judgement operations according to the contents of the data. The data of results obtained from the general operation is input to the specified register of the RAM 3 through a gate circuit G4. Data and carry signals obtained during judgment operations are coded at a gate circuit 18 and are supplied as the signal j to the address buffer 5 through a gate circuit G6.

The operating circuit 7 further includes a key judging circuit 19 which judges the contents of the respective signals input from the input terminals b, c and e and judges the kind of operated key. The resultant key code data is supplied to the specified register of the RAM 3 through a gate circuit G5. The judged result signal j is supplied to the address buffer 5 through a gate circuit G7. Arrows corresponding with numerals 15 and 17 in FIG. 2 indicate readng control signals outputted from the instruction decoder 4. Arrows corresponding with the gate circuits G1 to G7 are gate opening and closing control signals outputted from the instruction decoder 4. The operating instruction and the key judgement instruction are input to the adder 16 and the key judging circuit 19, respectively.

The mode of operation for performing the operations according to the complete formula in the above embodiment will now be described with reference to FIGS. 3 to 5. In this case, the calculation formula as shown below will be taken as an example, and the second numerical datum "3" will be changed to "5".

Formula: $2+3\times4+((123+\ldots$

When the power source switch of the calculator is turned on for starting the calculation, steps S1 to S4 of the flow chart shown in FIG. 3 are performed before a key is operated. When the power is turned on, a microinstruction for supplying an all-clear signal is outputted from the ROM 1 for clearing the respective circuits to attain the starting condition. Due to this, the respective registers inside the RAM 3 are cleared. As a result, a numerical value "0" is displayed at the display section 10 as shown in FIG. 5(*a*), and the character formula is not displayed. FF 11 and FF 13 are also reset simultaneously.

The above operation performed when the power is turned on is similarly performed when an all clear key AC is operated.

Describing the processing contents of the steps S1 to S4 of the flow chart, the steps S1 to S4 are for repeatedly performing the key sampling operation and the display operation within about 500 milliseconds. The data "255" ("11111111" when represented by a binary number) is written in ZFK in the step S1. Subsequently, the key sampling processing and the display processing are performed. The presence or the absence of the key operation is judged in the key sampling process. When the key operation is absent, the operation proceeds to the step S3. When the key operation is present, the key judgement process of the step S2 is performed. A decrementing operation by 1 of the data inside ZFK is performed during the step S3. In the step S4, a judgement is made as to whether or not the data inside ZFK is "0", and the operation returns to the step S2. The processings from S2 to S4 are repeated 256 times before the key is operated. The time required for repeating the steps S2 to S4 256 times is about 500 milliseconds. The respective processes of the steps S5 to S8 are for illuminating and turning off, that is, blinking with a 500 millisecond period, the character symbols corresponding to the changed data during the period in which the recall key RCL, the store key STO and so on are operated, and data corresponding to that part of the character formula of the display is recalled or processed for the change. The data 8 ("1000" when represented by a binary number) is added to YF in the step S5. In the step S6, a judgement is made as to whether or not the data inside YF is "0". When it is "0", the operation proceeds to the step S7, the process for lighting the character symbols of the character formula corresponding to the changed data is performed, and the operation returns to the step S1. When the data inside YF is not "0", that is, when it is "8", the operation proceeds to the step S8, the process for turning off the display of the data of the character formula is performed, and the operation returns to the step S1. Thus, the data in YF changes, by the processing of the step S5, according to "8", "0", "8", "0", ... with an interval of about 500 milliseconds. The respective processings in the steps S7 and S8 are alternately performed with an interval of about 500 milliseconds for performing the above blinking operation.

The detailed operation of the blinking operation will be described later. When the display step S2 is performed while replacing the specified display data with a blank code (turning off processing step S8), the display data is turned off. When the display step S2 is performed while replacing the original display code with the blank code (illuminating processing step S7), the display data is illuminated. When these processings are repeated at an interval of about 500 milliseconds, the display flashes.

When the ten keys TK are operated during the processings of step S2, the input processing of a step S10 is performed by the key judgement process of step S9. The input data is input to the register X and is displayed at the numerical data display section 10A. In the case of the equal key = among the function keys FK, the operation processing of step S11 is performed, the operation according to the preceding input data is performed and the operation result is displayed at the numerical data display section 10A. During this processing, all the data inside the registers A to J are cleared. When the character formula display keys A to J and the function keys FK, except for the equal key =, are operated, the function processing (step S12), according to the kind of operated key, is performed to execute the operation, or the operation proceeds to step S13 for performing the following steps S14 to S19.

In the steps S13 to S19, the processing for preparing the character formula data in the display buffer from the data in RAM 3 is performed. In the step S13, a judgement is made as to whether or not the data inside AK is "0". If it is not "0", the respective display preparing processings for displaying an opening parenthesis "[⇌ or a closing parenthesis "]" are performed. If AK=0, the operation skips to step S15, and a judgement is made as to whether or not the data inside AVT is "0". If it is not "0", the respective display preparing processings for the character symbol data (A to J) of the character formula corresponding to the data and the numerical data to the numerical display section are performed. If it is "0", the operation skips to step S17, and a judgement is made as to whether or not the data inside the AF is "0". If it is not "0", the display preparation for the function symbols (+, −, ×, ÷ and so on) inside AF is performed. If it is "0", the operation skips to step S19, and similar processings are performed during steps S12 to S18 for the respective registers (B to J).

When the character formula display keys [A] to [J] are operated after the recall key [RCL] has been operated, the specified data inside the display buffer is transferred to the register X (the processing of a step S20), and the blinking display preparation of a step S21 is performed. This blinking display preparation processing is performed for effecting the blinking of the particular character symbol of the character formula specified by recalling, for example, for blinking "B" when the operation is effected as "[RCL] [B]". Blink flag registers (not shown) corresponding to the registers A to J are disposed in the RAM 3 for setting "1" in the corresponding bit. After the specified character symbol of the character formula set with the flag is temporarily stored in the work area in step S8, it is replaced with the blink code.

When the character formula display keys [A] to [J] are operated after the store key [STO] is operated, the specified data stored in the register X by registering and so on is transferred to the register of the registers A to J corresponding to the specified data (processing of step S22), and the processing of step S23, as in the step S21, is performed.

When the key [2] is operated after the power is turned on or the all clear key [AC] is operated, the input data "2" is input to the third digit of the register X and is displayed at the numerical data display section. When the key [+] is operated subsequently, the data inside the register X is transferred to the register A. And the code (function data) of the symbol "+" is written in the second digit (AF) of the register A. As a result, the input data "2" is written in the register A and the symbol "+" is written in AF. (FIG. 4(a)). When the key [+] is operated, the key operation of the function key [+] is judged in the processing of step S9. The operation then proceeds to step S12, and the respective processings of steps S12, and S15 to S19 are performed. As a result, the display condition of the display section 10 after the respective keys are operated becomes as shown in FIG. 5(b). Thus, the operator of the calculator is capable of confirming the key operations of the ten keys and the key [+] by referring to the display contents, and is capable of comparing the calculation formula with the display.

When the keys [3] and [x] are operated sequentially, the input data "3" and the function code "x" are written in the third and second digits of the register B as shown in FIG. 4(b), in the same manner as when the keys [2] and [+] are operated. The display condition of the display section 10 becomes as shown in FIG. 5(c). When the key [×] is operated, the key judging circuit 19 of the operating circuit 7 outputs the key code data of the key [×] and also outputs the judged result signal j of the key [×]. Both of them are supplied to the RAM 3 or the address buffer 5. Then, the adder 16 of the operating circuit 7 compares the data "+" inside AF with the data "+" inside BF and performs a judgement as to whether the operation is to be executed. In this case, since the level of the data inside BF input this time is higher than the level of the data inside AF input previously, the operation is not performed, and the function processing for transferring the data "3x" stored in the register X to the register B is performed in step S12.

When the opening parenthesis [[] is operated next, the operating circuit 7 compares the input function data "[" with the data "×x" inside AF and performs a judgement as to whether or not the operation is to be executed. The parenthesis level "1" is written in CK of the register C simultaneously. XVT is cleared. FIG. 4(c) shows the condition of the RAM 3 at this stage. Processings similar to those for the register C in the steps S13 and S14 in the flow chart of FIG. 3 are performed. The data "[" is supplied to the display section 10, and the display section 10 displays "A+B×[" and "0" as shown in FIG. 5(d). When the key [4] is operated, the input data "4" is written in XVT. When the key [+] is operated subsequently, the data "4" from XVT is written in CVT, and the code for the symbol "+" is written in CF. As a result, the contents of the register C become as shown in FIG. 4(d). When the opening parenthesis [ is operated twice in a row, upon the first operation, the parenthesis "1" is written in DK, and DK="1". Upon the second operation, DK=2. Then, the display section 10 displays the data "A+B×[C+[", "A+B×[C+[[", and "0" sequentially. FIG. 5(e) shows the display condition after the second operation of the opening parenthesis. When the keys 1, 2 and 3 are sequentially operated to input the data "123", the contents of the registers A to D do not change, and the data "123" is input to the register X so that XVT="123". When the key + is operated next, the data "123+" is written in the register D. The display section 10 then displays the character symbols "A+B×[C+[[D+" and the numerical data "123" as shown in FIG. 5(f). FIG. 4(e) shows the stored condition of the RAM 3 at this time. In this manner, the operating condition is displayed at the display section 10 by the character formula and the numerical data according to the key operation signal input according to the calculation formula.

When it is desired to confirm or change to "5" the second numerical data "2" of the data input by the above-mentioned key operations, the recall key [RCL] and the key [B] are sequentially operated. The processings of steps S20 and S21 and the steps S1 to S8 described above are performed, the data "B" of the third digit is transferred from the upper digit side of the display buffer 31, and "1" is set in the third bit from the upper digit side of the blink flag register. By the processings in steps S7 and S8, the data "B" and the blank code are alternately written in the third digit of the display buffer with an interval of about 500 milliseconds. Due to this, the recalled data "3" is displayed at the numerical data display section 10A of the display section 10, and the character symbol "B" alone of the character formula at the character formula display section 10B flashes as shown in FIG. 5(g).

When the key [5] is operated next to input the changed data, the input data "5" is input to the register X, and the changed data "5" is displayed at the numerical data display section 10A and the character symbol "B" keeps blinking as shown in FIG. 5(h).

When the store key [STO] and the key [B] are operated next, the data inside the register X is transferred to BVT by the processings of steps S22 and S23 and steps S1 to S8. Thus, the contents of the register B become as shown in FIG. 4(f), and the display condition of the display section 10 is as shown in FIG. 5(i), which is unchanged from the condition shown in FIG. 5(h). The blinking condition of the character symbol "B" is interrupted by clearing the blink flag upon the next operation of a key.

FIG. 6 shows a modification of the above embodiment, in which the data "B=3" is displayed at the numerical data display section 10A as shown in the figure when the recall key [RCL] is operated. In this case, it is not necessary to display by blinking the character symbol "B" in the character formula.

Although the calculation formula is only partially input in the above embodiment and the numerical data corresponding to the character symbol of the character formula is not changed, the calculations in the parenthesis are performed to provide "129" when operations such as "[6] [☐]" are performed thereafter. The numerical data corresponding to the character symbol D changes from "123" to "129", and the contents of the respective registers become as shown in FIG. 4(g).

Although the character formula display keys were character keys of [A] to [J] in the above embodiment, the number of keys may be conveniently decreased by using the keys which are generally equipped with a calculator, such as the ten keys and the function keys, as double function keys. The data which is changeable is not limited to the numerical data, but may include all the data in the character formula. Further, slide keys [→] and [←] may be included. A display mark (cursor) may be displaced horizontally one data position by these slide keys [→] and [←] below or above the character symbol to be changed when the recall key [RCL] is operated as in A+B̲×C+[[D+, so that the changed data may be displayed below or above the character symbol to be changed.

Although the data corresponding to the specified character symbol has been recalled once with the recall key [RCL] and the new data was thereafter input in the above embodiment, the input of the new data may be directly performed by the store key [STO] without operating the recall key [RCL].

Further, although the character symbol was not displayed when the input number was "0", the step 16 may be performed between the steps S17 and S18 for displaying the character symbol even when the input number is "0".

The second embodiment of the present invention will now be described referring to FIG. 7. With an operating system according to the complete formula in the first embodiment, the priority of the operations is automatically judged, and the operations are performed according to the order of priority so that the display of the character formula gradually changes according to the operation process. Since all the operations are completed upon operation of the equal key, the result alone remains, and the character formula display is cleared. For exmple, the character formula display when "2+3×" is input becomes "A+B×". When "4+" is input next, the operation up to "2+3×4" is performed and the character display becomes "A+". The numeral corresponding to A at this time is "14".

Thus, according to the second embodiment of the present invention, the character formula is displayed in correspondence with the input calculation formula, and the character formula display is retained after the operations are completed operation of the equal key. The second embodiment will be explained with reference to a case in which an example of the calculation formula described below is taken, and similar calculations are repeated by replacing the second numerical datum "456" and the third numerical datum "789" with different data.

Formula: 123+456×(789+912)=

The system construction is the same as in the first embodiment. In the flow chart shown in FIG. 3, the operation is not performed in the processing of step S12, but the operations are processed as a whole in step S11.

FIG. 7(a) shows the stored condition of the RAM 3 when the calculations according to the above formula are completed and the result is obtained. The answer "775779" is displayed at the numerical data display section 10A, and the character formula "A+B×[C+D]=" is displayed at the character formula display section 10B. Thus, the operations are not performed according to the priority of the operations, but all the operations are performed at once when the equal key [=] is operated, and the contents of the registers A to D of the RAM 3 and the contents of the display buffer register 31 remain unchanged. In this manner, the character formula "A+B×[C+D]=" is locked, so that repeated calculations with different data and the same character formula may be performed by inputting the desired data for the variables A to D and operating the equal key [=].

The mode of operation will be described, taking as an example a case wherein "5" is input for the variable B, "10000" is input for the variable C, and the calculation formula "123+5×(10000+912)=" is performed. The key [5] is first operated to write the data "5" in XVT, and the store key [STO] and the key [B] are operated sequentially. The data "5" in XVT is transferred to BVT; the preceding data "456" is cleared and the data "5" is written in BVT. FIG. 7(b) shows the stored condition of the RAM 3, and the changed input data "5" is displayed at the numerical data display section. The character formula as described above remains displayed at the character formula display section 10B.

The preceding data "789" of the register C is recalled to the numerical data display section for display. Thus, after visually confirming the preceding data "789" for the variable C, the recall key [RCL] and the key [C] are operated for inputting the new data "10000". The data "789" in CVT is recalled by step S14 and is transferred to XVT. The preceding recalled data "789" is displayed at the numerical data display section 10A. The character formula as described above remains displayed at the character formula display section 10B. FIG. 7(c) shows the stored condition of the RAM 3 at this stage.

After inputting "10000", the store key [STO] and the key [C] are operated for inputting the changed data "10000" in the register C. Then, the data "10000" is input to XVT, and the data "10000" is displayed in place of the preceding data "789" at the numerical data display section. In the step S13, the data "10000" in XVT is transferred to CVT. FIG. 7(d) shows the stored condition of the RAM 3 at this stage, and the character formula is locked.

When the equal key [=] is operated for performing the above calculations, the calculations with the changed data are performed to provide the answer "54683". The answer is written in XVT and is displayed at the numerical data display section. FIG. 7(e) shows the stored condition of the RAM 3 at this stage. The character formula as described above is locked at the character formula display section 10B.

In a similar manner, similar calculations may be performed repeatedly by locking the displayed condition of the operated character formula for the calculation formula which was initially input and used for calculation, and then inputting other numerical data corresponding to variables in the character formula. In this case, since the display condition of the character formula is locked, the data in AF to JF and the data in AK to JK does not change. The operation sequence and the kinds of operations for the character formula may be stored in a fixed manner. The storage areas AVT to JVT corresponding to the variables A to J of the character formula are fixed. In other words, the correspondence between the storage areas AVT of JVT and the variables A to J of the character formula is retained. When the numerical data of the calculation formula corresponding to the variables A to J is changed, the data inside the storage areas (AVT to JVT) corresponding to the changed numerical data alone is rewritten.

Various repeated operations are performed with the character formula "A+B×[C+D]=". For completing these repeated calculations and starting calculations with another character formula, the all clear key AC is operated. The key operation of the key AC is detected in step S9, and the clear processing (not shown) is performed. Thus, the data inside the register X and the registers A to J is cleared, the character formula data inside the display buffer 31 is cleared, and the initial condition setting processing for the respective circuits is performed. Due to this, "0" is displayed at the numerical data display section, and nothing is displayed at the character formula display section. Thus, this embodiment is advantageous in that various similar calculations may be performed in repetition with a single locked character formula, and the key operations for accomplishing this are extremely easy. This enables repeated calculations which have been hitherto possible only with a calculator having a program operation function, providing great advantages.

Figure 8:
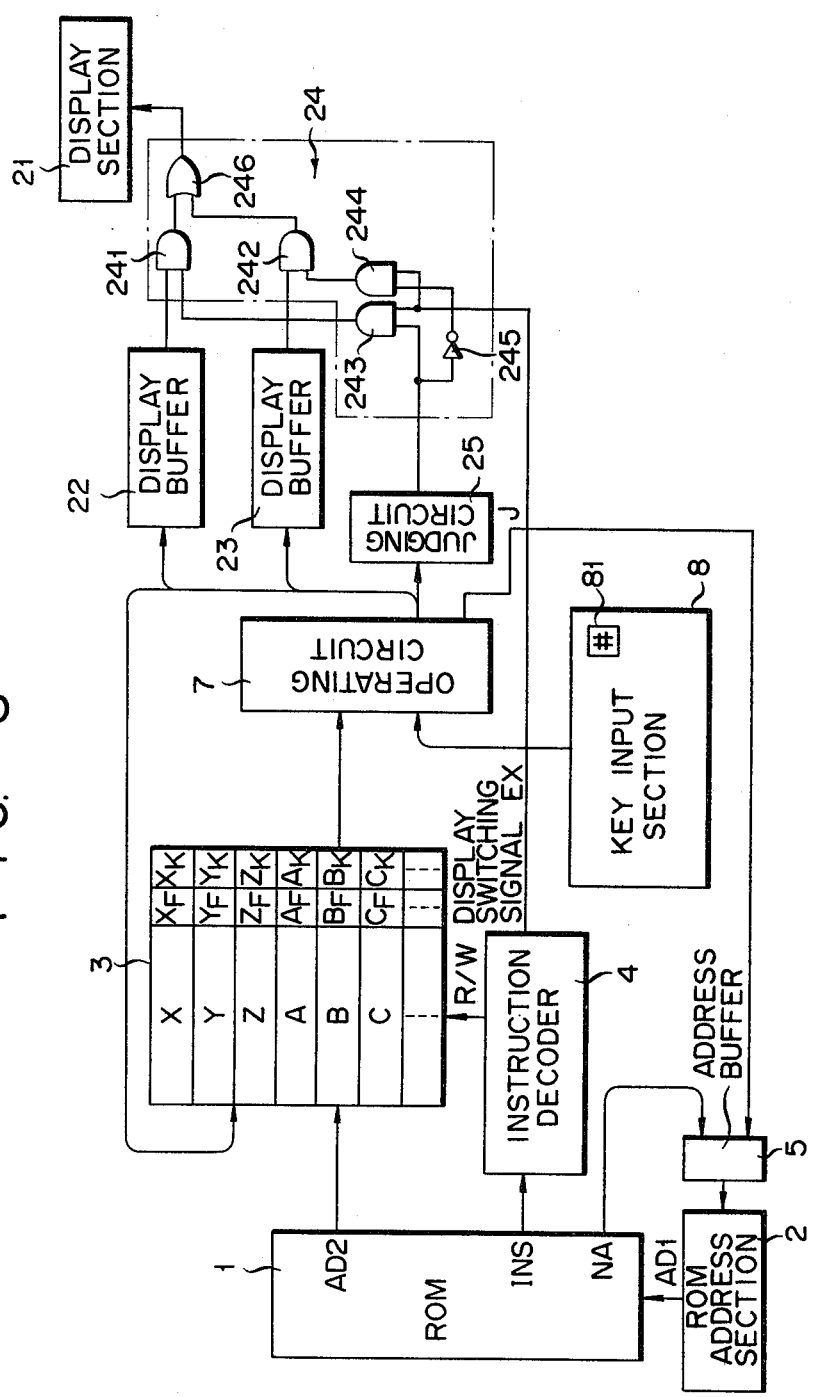
FIG. 8 is a block diagram illustrating the system construction of the third embodiment of the present invention.

The third embodiments of the present invention will now be described with reference to FIG. 8. Although the display of the input number and the operation result and the display of the character formula at the display section were performed simultaneously in the previous embodiment, these are displayed by selective switching at a single display section in this embodiment. The same numerals denote the same parts as in FIG. 1, and the drawings and the description are simplified.

The key input section 8 includes a display changeover key [#] 81 in addition to the above keys. The display changeover key [#] 81 is a key for changing over between displaying the operating condition during operation according to the character formula to be described later, and displaying according to the numerical data at a display section 21. In this embodiment, the display changeover key [#] 81 comprises an on/off key. When the display changeover key [#] 81 is turned on, the character formula is displayed at the display section 21. When the display changeover key [#] 81 is turned off, the numerical data is displayed at the display section 21. The complete formula data, that is, the character formula display data stored in the registers A to J of the RAM 3, is input to a first display buffer 22 through the operating circuit 7. The numerical data, such as the input data and the operation result stored in the register X, is input to a second display buffer 23 through the operating circuit 7. When the display changeover key [#] 81 is turned on, the character formula display data in the first display buffer 22 is selected by a display changeover circuit 24 and is displayed at the display section 21. When the display changeover key [#] 81 is turned off, the numerical data in the second display buffer 23 is selected and is displayed at the display section 21.

Describing the construction of the display changeover circuit 24, the output data of the first display buffer 22 is input to a first input terminal of an AND gate 241. The output data of the second display buffer 23 is input to a first input terminal of an AND gate 242. A key judgement signal [#] outputted from a judging circuit 25 for judging the key code outputted from the operating circuit 7 and for outputting a signal "1" upon detecting the key code of the display changeover key [#], is directly input to a first input terminal of an AND gate 243; it is also input to a first input terminal of an AND gate 244 through an inverter 245. The key judgement signal [#] is a signal of binary logic level "1" when the display changeover key [#] 81 is turned on, and is "0" when it is turned off. A display changeover signal EX outputted from the instruction decoder 4 is "1" when the display changeover key [#] 81 is turned on, and "0" when it is turned off. The display changeover signal EX is input to second input terminals of the AND gates 243 and 244. The output of the AND gate 243 is input to a second input terminal of the AND gate 241, and the output of the AND gate 244 is input to a seocond input terminal of the AND gate 242. The respective outputs of the AND gates 241 and 242, that is, the character formula display data or the numerical data, are supplied to the display section 9 through an OR gate 246.

The display section 21 employs a display system of dot matrix construction. For changing over and displaying the character formula, the input data is displayed by the characters A, B, C, D, . . . according to the input sequence, and the function data is displayed by the symbols +, −, ×, ÷, [, ], and so on. For changing over and displaying the numerical data, the data is displayed by the numerals 0, 1, . . . 9 as in the conventional case. Before starting the calculation, the all clear key AC (not shown) at the top of the key input section 8 is operated to initialize the respective circuits. The display changeover key [#] 81 is turned on for displaying the operating condition with the character formula. Then, the key judgement signal # of level "1" is continuously outputted from the judging circuit 25. The microinstruction INS of the predetermined content is outputted from the ROM 1 to be supplied to the instruction decoder 4. Due to this, a display changeover signal EX of level "1" is outputted and is kept outputted. The output of the AND gate 15 becomes "1", and the output of the AND gate 244 becomes "0", so that the AND gate 241 is opened and the AND gate 242 is closed. Thus, the output data of the first display buffer 22 is selected by the display changeover circuit 124 and is displayed.

When the display changeover key [#] is turned off before or during the calculation, both the key judgement signal # and the display changeover signal EX become "0". Due to this, the AND gate 241 is closed and the AND gate 242 is opened. Accordingly, the output data of the second display buffer 23 is selected in place of the output data of the first display buffer 22 and is supplied to the display section 21. The data of XVT is displayed at the display section 21. The display of the operating condition by the numerical data is performed afterwards.

Although the display changeover keys comprise on/-off keys in the above embodiment, they may comprise self-recovering keys which are turned on and off only during the key operation, so that the display of the operating condition is changed over only during the time the keys are operated.

What is claimed is:

1. An equation display device for a calcuator, comprising:
   a key input section including at least numerical entry keys and function keys of +, −, ×, ÷, etc., for inputting numeral data and function data according to a calculation equation;
   a memory coupled to said key input section for storing the numeral data and function data inputted from said key input section;
   calculating means coupled to said memory for performing a calculation, according to the calculation equation, based on the data stored in said memory;
   a display section coupled to said calculating means for displaying a result of calculation outputted from said calculating means;
   input control means coupled to said memory for judging the data inputted by the operation of said numerical entry keys and said function keys of said key input section and for performing a key input processing;
   character equation preparing means coupled to, and controlled by, said input control means for treating the data inputted by said key operation according to the calculation equation such that each numeral data is replaced by respective character data in the order of inputting of the numeral data, and for preparing display data so that the inputted calculation equation is displayed in the form of a character equation;
   a display register coupled to said character equation preparing means for sequentially storing the character equation display data prepared by said character equation preparing means; and
   display control means coupled to said display register and responsive to said character equation display data outputted from said display register for displaying the character equation on said display section.

2. The equation display device of claim 1, wherein said display section includes a first display area for displaying the result of calculation outputted from said calculation means and a second display area for displaying the character equation.

3. The equation display device of claim 1, wherein said key input section includes a display changeover key for supplying an operation signal; and said display control means includes means for selectively displaying the result of calculation outputted from said calculating means and the character equation outputted from said character equation preparing means on said display section according to said operation signal of said display changeover key.

4. The equation display device of claim 1, wherein said input control means includes means for causing said numeral data to be replaced by associated characters according to the sequence of the inputted data; means for preparing display data for displaying the calculation equation in the form of the algebraic formula; means for causing the function data and characters corresponding to numeral data eliminated by a calculation under way to be eliminated; and means for causing new numeral data obtained in one of (i) the calculation process and (ii) the completion of the calculation to be replaced by said characters for display on the display section.

5. The equation display device of claim 1, wherein said input control means includes: means for causing the numeral data of the input data to be replaced by arbitrary characters according to an input sequence of the calculation equation; means for preparing display data for displaying said calculation equation in the form of the algebraic formula; and means for causing the display data for constituting said algebraic formula to be held in said display register in spite of one of (i) a calculation process of said calculation equation and (ii) the completion of the calculation, so that it can be displayed according to the algebraic formula.

6. An equation display device for a calculator comprising:
   a key input section including at least numerical entry keys and function keys of +, −, ×, ÷, etc., for inputting numeral data and function data according to a calculation equation;
   a memory coupled to said key input section for storing the numeral data and function data inputted from said key input section;
   calculating means coupled to said memory for performing a calculation, according to the calculation equation, based on the data stored in said memory;
   a display section coupled to said calculating means for displaying a result of calculation outputted from said calculating means;
   input control means coupled to said memory for judging the data inputted by the operation of said numerical entry keys and said function keys of said key input section and for performing a key input processing;
   character equation preparing means coupled to, and controlled by, said input control means for treating the data inputted by said key operation according to the calculation equation such that numeral data is replced by character data in the order of inputting of said numeral data and for preparing display data so that the calculation equation is displayed in the form of a character equation;
   a display register coupled to said character equation preparing means for sequentially storing the character equation display data prepared by said character equation preparing means;
   display control means coupled to said display register and responsive to said character equation display data outputted from said display register for displaying the character on said display section; and
   means coupled to said character equation preparing means for designating arbitrary characters in the character equation displayed on said display section and for causing data corresponding to the designed characters to be called from said memory to supply said called data to said display control means.

7. The equation display device of claim 6, wherein said display section has a display area for displaying the result of calculation outputted from the calculations means and a display area for displaying the character equation.

8. The equation display device of claim 6, wherein said key input section includes a display changeover key for supplying an operation signal; and said display control means includes means for selectively displaying the result of calculation outputted from said calculating means and the character equation outputted from said character equation preparing means on said display section according to said operation signal of said display changeover key.

9. The equation display device of claim 6, wherein said input control means includes means for causing said numeral data to be replaced by associated characters according to the sequence of the inputted data; means for preparing display data for displaying the calculation equation in the form of the algebraic formula; means for causing the function data and characters corresponding to numeral data eliminated by a calculation under way to be eliminated; and means for causing new numeral data obtained in one (i) the calculation process and (ii) the completion of the calculation to be replaced by said characters for display on the display section.

10. The equation display device of claim 6, wherein said input control means includes: means for causing the numeral data of the input data to be replaced by arbitrary characters according to an input sequence of the calculation equation; means for preparing display data for displaying said calculation equation in the form of the algebraic formula; and means for causing the display data for constituting said algebraic formula to be held in said display register in spite of one of (i) a calculation process of said calculation equation and (ii) the completion of the calculation, so that it can be displayed according to the algebraic formula.

11. An equation display device for a calculator, comprising:
a low input section including at least numerical entry keys and function keys of +, −, ×, ÷, etc., for inputting data and function data according to a calculation equation;
a memory coupled to said key input section for storing the numeral data and function data inputted from said key input section;
calculating means coupled to said memory for performng a calculation, according to the calculating equation, based on the data stored in said memory;
a display section coupled to said calculating means for displaying a result of calculation outputted from said calculating means;
input control means coupled to said memory for judging the data inputted by the operation of said numerical entry keys and said function keys of said key input section and for performing a key input processing;
character equation preparing means coupled to, and controlled by, said input control means for treating the data inputted by said operation according to the calculation equation such that each numeral data is replaced by respective character data in the order of inputting the numeral data, and for preparing display data so that the inputted calculation equation is displayed in the form of a character equation;
a display register coupled to said character equation preparing means for sequentially storing the character equation display data prepared by said character equation preparing means;
display control means coupled to said display register and responsive to said character equation display data outputted from said display register for displaying the character equation on said display section; and
means coupled to said character equation preparing means for designating arbitrary characters in the character equation displayed on said display section and for modifying the data in said memory corresponding to the designated characters.

12. The equation display device of claim 11, wherein said display section includes a first display area for displaying the result of calculation outputted from said calculating means and a second display area for displaying the character equation.

13. The equation display device of claim 11, wherein said key input section includes a display changeover key for supplying an operation signal; and said display control control means includes means for selectively displaying the result of calculation outputted from said calculating means and the character equation outputted from said character equation preparing means on said display section according to said operation signal of said display changeover key.

14. The equation display device of claim 11, wherein said input control means includes means for causing said numeral data to be replaced by associated characters according to the sequence of the inputted data; means for preparing display data for displaying the calculation equation in the form of the algebraic formula; means for causing the function data and characters corresponding to numeral data eliminated by a calculation under way to be eliminated; and means for causing new numeral data obtained in one of (i) the calculation process and (ii) the completion of the calculation to be replaced by said characters for display on the display section.

15. The equation display device of claim 11, wherein said input control means includes: means for causing the numeral data of the input data to be replaced by arbitrary characters according to an input sequence of the calculation equation; means for preparing display data for displaying said calculation equation in the form of the algebraic formula; and means for causing the display data for constituting said algebraic formula to be held in said display register in spite of one of (i) a calculation process of said calculation equation and (ii) the completion of the calculation, so that it can be displayed according to the algebraic formula.

16. An equation display device for a calculator, comprising:
a key input section including at least numerical entry keys and function keys +, −, ×, ÷, etc., for inputting numeral data and function data according to a calculation equation;
a memory coupled to said key input section for storing the numeral data and function data inputted from said key input section;
calculating means coupled to said memory for performing a calculation, according to the calculation equation, based on the data stored in said memory;
a display section coupled to said calculating means for displaying a result of calculation outputted from said calculating means;
input control means coupled to said memory for judging the data inputted by the operation of said numerical entry keys and said function keys of said key input section and for performing a key input processing;
character equation preparing means coupled to, and controlled by, said input control means for treating the data inputted by said key operation according to the calculation equation such that each numeral data is replaced by respective character data in the order of inputting of the numeral data, and for preparing display data so that the inputted calculation equation is displayed in the form of a character equation;

a display register coupled to said character equation preparing means for sequentially storing the character equation display data prepared by said character equation preparing means;

designating means connected to said character equation preparing means for designating arbitrary characters in the character equation displayed on the display section; and display control means coupled to said display register and responsive to said character display data outputted from said display register for causing displaying of the character equation on said display section and for causing, at the same time, the characters designated by said designating means to be displayed on said display section in a manner as to distinguish them from the other characters displayed on said display section.

17. The equation display device of claim 16, wherein said display control means includes flashing display control means causing the characters designated by said designating means to be flashingly displayed, whereas the other characters are not so flashingly displayed.

18. The equation display device of claim 16, wherein said display section includes a first display area for displaying the result of calculation outputted from said calculation means and a second display area for displaying the character equation.

19. The equation display device of claim 16, wherein said key input section includes a display changeover key for supplying an operation signal; and said display control means includes means for selectively displaying the result of calculation outputted from said calculating means and the character equation outputted from said character equation preparing means on said display section according to said operation signal of said display changeover key.

20. The equation display device of claim 16, wherein said input control means includes means for causing said numeral data to be replaced by associated characters according to the sequence of the inputted data; means for preparing display data for displaying the calculation equation in the form of the algebraic formula; means for causing the function data and characters corresponding to numeral data eliminated by a calculation under way to be eliminated; and means for causing new numeral data obtained in one of (i) the calculation process and (ii) the completion of the calculation to be replaced by said characters for display on the display section.

21. The equation device of claim 16, wherein said input control means includes: means for causing the numeral data of the input data to be replaced by arbitrary characters according to an input sequence of the calculation equation; means for preparing display data for displaying said calculation equation in the form of the algebraic formula; and means for causing the display data for constituting said algebraic formula to be held in said display register in spite of one of (i) a calculation process of said calculation equation and (ii) the completion of the calculation, so that it can be displayed according to the algebraic formula.

* * * * *